United States Patent [19]

Ohkura et al.

[11] Patent Number: 5,517,669
[45] Date of Patent: May 14, 1996

[54] CYCLIC DATA COMMUNICATION SYSTEM

[75] Inventors: Yoshinori Ohkura, Mito; Takuji Hamada, Hitachiota; Shunji Inada, Hitachi; Shinichiro Yamaguchi, Mito; Hiroshi Tomizawa, Hitachi, all of Japan

[73] Assignee: Hitachi, Ltd., Tokyo, Japan

[21] Appl. No.: 213,782

[22] Filed: Mar. 16, 1994

[30]  Foreign Application Priority Data

Mar. 19, 1993  [JP]  Japan ................................. 5-060414

[51] Int. Cl.$^6$ ........................................................ G06F 13/00
[52] U.S. Cl. ........................ 395/821; 395/872; 395/200.08
[58] Field of Search ........................................ 395/200, 275, 395/325, 800, 200.08, 821, 825, 840, 856, 872, 200.8; 370/32, 85.1, 95.1, 105.2

[56]  References Cited

U.S. PATENT DOCUMENTS

| | | | |
|---|---|---|---|
| 4,219,873 | 8/1980 | Kober et al. | 395/650 |
| 4,523,274 | 6/1985 | Fukunaga et al. | 395/325 |
| 4,574,345 | 3/1986 | Konesky | 395/325 |
| 4,600,988 | 7/1986 | Tendulkar et al. | 395/325 |
| 4,884,195 | 11/1989 | Endo | 395/200 |
| 4,979,096 | 12/1990 | Ueda et al. | 395/325 |
| 5,029,163 | 7/1991 | Chao et al. | 370/95.1 |
| 5,056,113 | 10/1991 | Takai | 375/58 |
| 5,131,081 | 7/1992 | Mackenna et al. | 395/275 |
| 5,146,605 | 9/1992 | Beukema et al. | 395/375 |

FOREIGN PATENT DOCUMENTS 4133540A  5/1992  Japan.

*Primary Examiner*—Krisna Lim
*Attorney, Agent, or Firm*—Kenyon & Kenyon

[57]  ABSTRACT

A data communication system carries out transmission and reception of periodic data between a plurality of computers, and especially an improved data communication system which aims at more effective utilization of a system bus in each computer and which also aims at more effective utilization of a data transmission channel transmitting periodic data, so that the load imposed on the system bus during transfer of periodic data in each computer can be minimized, and the rate of occupation of the data transmission channel during transmission and reception of periodic data can also be minimized.

19 Claims, 9 Drawing Sheets

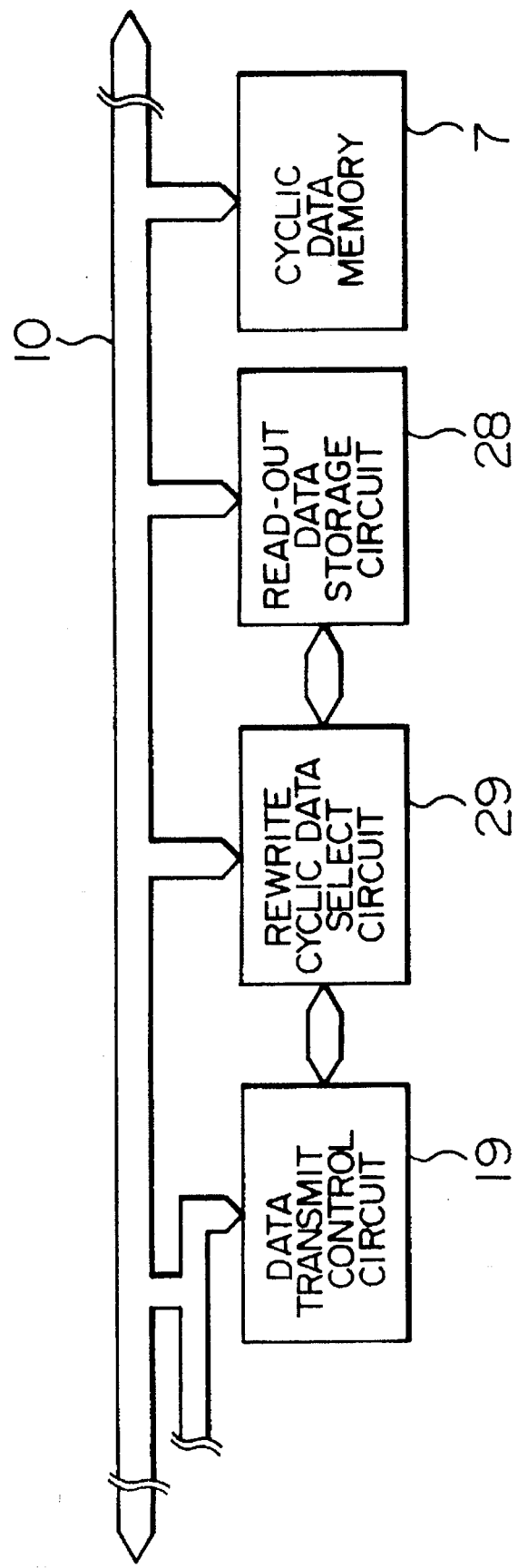

FIG. 11A

| FRAME HEADER | DATA INFORMATION | REWRITE DATA | DATA INFORMATION | REWRITE DATA | ... | DATA INFORMATION | REWRITE DATA | FCS |

FIG. 11B

| FRAME HEADER | REWRITE TABLE 0\|0\|1\|0\|1\|1\|0\|1\|1\|0\|1\|1\|0\|0\|1\|1 | REWRITE DATA | REWRITE DATA | REWRITE DATA | REWRITE DATA | REWRITE DATA | FCS |

FCS : FRAME CHECK SEQUENCE ··· BIT ERROR CHECK CODE IN FRAME

BUS TYPE

RING TYPE

STAR TYPE ance controller coupled to the data transmission channel. Among cyclic data stored in the cyclic memory, those cyclic data having a higher access frequency than the others are selected, and the selected cyclic data are transferred to and stored in the shared memory, while the other cyclic data are stored in the cyclic memory only. Because of the above arrangement, each of the CPU's is only required to make access to the selected cyclic data stored in the shared memory through the system bus when access to the selected cyclic data is necessary, and there is no need for activating the communication controller.

CYCLIC DATA COMMUNICATION SYSTEM

BACKGROUND OF THE INVENTION

This invention relates to a data communication system used for transmission and reception of periodic data between a plurality of computers and relates also to such a data communication method.

A cyclic communication system disclosed in, for example, JP-A-4-133540 is known as a data communication system of this kind.

The cyclic communication system disclosed in the application cited above is a communication system in which a plurality of control computers are coupled to a transmission channel (a data transmission channel) for transmission and reception of cyclic data between these plural control computers. Each of these control computers includes a plurality of CPU's, a shared memory, a system bus, a communication controller and a cyclic memory. In each of the control computers, the CPU's, the shared memory and the communication controller are coupled to each other by the system bus respectively, and the communication controller coupled to the cyclic memory is connected to the data transmission channel. Among cyclic data stored in the cyclic memory, those cyclic data having a higher access frequency than the others are selected, and the selected cyclic data are transferred to and stored in the shared memory, while the other cyclic data are stored in the cyclic memory only. Because of the above arrangement, each of the CPU's is only required to make access to the selected cyclic data stored in the shared memory through the system bus when access to the selected cyclic data is necessary, and there is no need for activating the communication controller.

SUMMARY OF THE INVENTION

It is an object of the present invention to provide a data communication system which is advantageous in that the load imposed on a system bus during transfer of periodic data in each of a plurality of computers can be reduced, and the rate of occupation of a data transmission channel during transmission and reception of periodic data can also be reduced.

According to one of the features of the present invention, there is provided a data communication system comprising a data transmission channel, and a plurality of control computers connected to the data transmission channel through communication controllers respectively, wherein data held in one of the plural computers is transferred to the own communication controller in a data rewrite period and is then compared in the communication controller with the data transferred already onto the data transmission channel in the preceding data rewrite period, and, when the value of the data transferred now is detected to change from that of the preceding data, the data is transferred onto the data transmission channel.

According to another feature of the present invention, there is provided a data communication system which comprises a plurality of control computers coupled to a data transmission channel, each of the control computers including at least one CPU, a main memory, a system bus connected to the CPU and the main memory, and a communication controller connected between the system bus and the data transmission channel and having built-in data transmission and reception control circuits and a built-in memory for storing periodic data and in which periodically acquired periodic data is transmitted and received between the plural control computers through the data transmission channel, and each of the CPU's uses the periodic data stored in the main memory for executing required date processing, wherein each of the communication controllers receives the periodic data required at least for the own control computer and stores the received periodic data in the main memory, and means is provided for reading out rewritten periodic data only among those stored in the main memory to be transmitted and transmits the read-out periodic data onto the data transmission channel.

The above and other features of the present invention will become apparent from the following description.

BRIEF DESCRIPTION OF THE DRAWINGS

FIG. 10 is a block diagram showing the principal structure of the communication controller when rewritten cyclic data is selected in the communication controller in the modification shown in FIG. 9.

FIGS. 11A and 11B illustrate two forms of the data frame storing rewritten cyclic data transmitted to the data transmission channel respectively.

DESCRIPTION OF THE PREFERRED EMBODIMENTS

Preferred embodiments of the present invention will now be described in detail by reference to the drawings.

Figure 1:
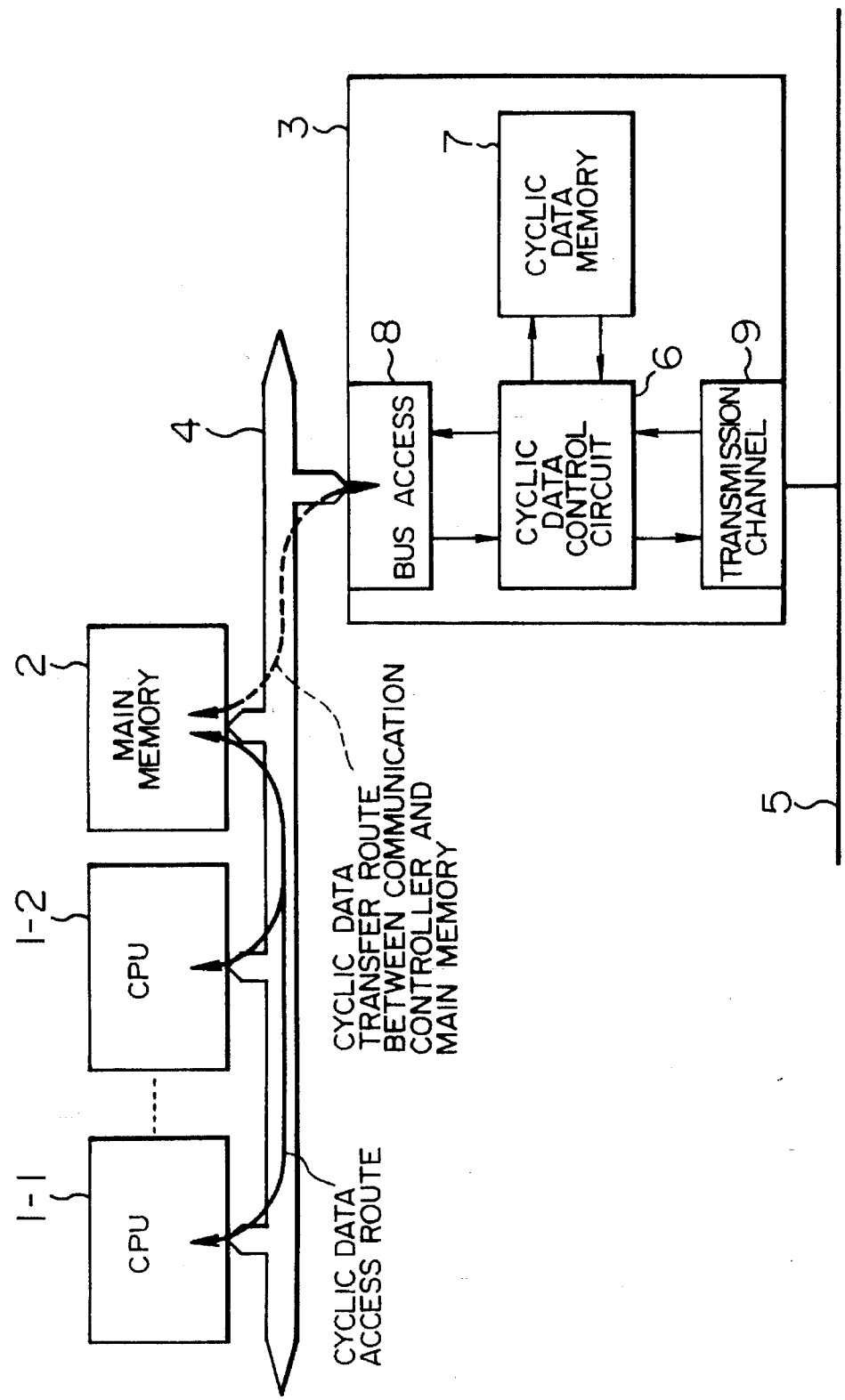
FIG. 1 is a block diagram showing the principal structure of an embodiment of the data communication system according to the present invention.

FIG. 1 is a block diagram showing the principal structure of an embodiment of the data communication system according to the present invention, and FIG. 1 illustrates the case where the data communication system of the present invention is applied to a cyclic communication system.

Referring to FIG. 1, the data communication system embodying the first aspect of the present invention comprises a plurality of control computers. In FIG. 1, the reference numerals 1-1, 1-2, 2, 3, 4, 5, 6, 7, 8, and 9 designate a first CPU (central processor unit), a second CPU (central processor unit), a main memory, a communication controller, a system bus, a data transmission channel, a cyclic data control circuit, a cyclic data memory, a bus access control circuit, and a transmission channel access control circuit, respectively.

The first CPU 1-1, the second CPU 1-2 and the main memory 2 are coupled to each other by the system bus 4, and the communication controller 3 is composed of the cyclic data control circuit 6, the cyclic data memory 7, the bus access control circuit 8 and the transmission channel access control circuit 9. The cyclic data control circuit 6 is connected to each of the cyclic data memory 7, the bus access control circuit 8 and the transmission channel access control circuit 9, while the bus access control circuit 8 and the transmission channel access control circuit 9 are connected to the system bus 4 and the data transmission channel 5 respectively.

Figure 2:
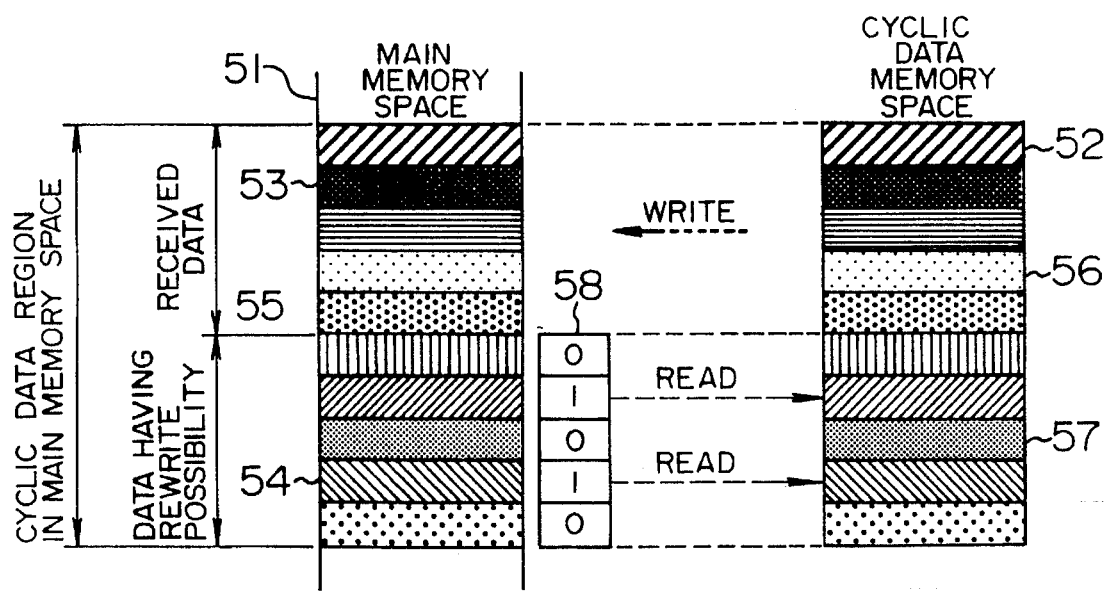
FIG. 2 illustrates one form of the state of a main memory space of the main memory and one form of the state of a cyclic data memory space of the cyclic data memory in the data communication system shown in FIG. 1.

FIG. 2 illustrates one form of the state of a main memory space of the main memory 2 and one form of the state of a cyclic data memory space of the cyclic data memory 7. Referring to FIG. 2, the reference numerals 51, 52, 53, 54, 55, 56, 57 and 58 designate the main memory space of the main memory 2, the cyclic data memory space of the cyclic data memory 7, a received data region in the main memory 2, a rewritable data region in the main memory 2, a cyclic data region in the main memory 2, a received data region in the cyclic data memory 7, a rewritable data region in the cyclic data memory 7, and a rewrite table, respectively.

The main memory space 51 of the main memory 2 consists of the received data region 53 where received cyclic data are stored and the rewritable data region 54 where cyclic data having a rewrite possibility are stored, and the combination of these regions 53 and 54 forms the cyclic data region 55. The cyclic data memory space 52 of the cyclic data memory 7 consists of the received data region 56 where received cyclic data are stored and the rewritable data region 57 where cyclic data having a rewrite possibility are stored. Further, in the illustrated embodiment of the data communication system, the rewrite table 58 corresponding to the rewritable data region 54 is provided in the main memory 2 to indicate whether or not cyclic data having the rewrite possibility have been rewritten already.

The operation of the first embodiment of the data communication system of the present invention having the above structure will be described by reference to FIGS. 1 and 2.

When cyclic data is periodically transmitted to the data communication system by way of the data transmission channel 5, each of the control computers acquires this cyclic data in its communication controller 3. In this case, in the communication controller 3, the transmission channel access control circuit 9 connected to the transmission channel 5 receives the cyclic data transmitted on the data transmission channel 5, and, after transforming the received cyclic data into the format that can be processed in the communication controller 3, supplies the transformed cyclic data to the cyclic data control circuit 6. The cyclic data control circuit 6 decides whether or not the received cyclic data is required for the own control computer, and, when the result of decision proves that the received cyclic data is not required, the received cyclic data is discarded. On the other hand, when the result of decision proves that the received cyclic data is required, the cyclic data control circuit 6 stores the cyclic data in the received data region 56 of the cyclic data memory 7. At the same time, the cyclic data control circuit 6 supplies the cyclic data to the bus access control circuit 8 and instructs the bus access control circuit 8 to transfer the cyclic data to the main memory 2. In response to this instruction, the bus access control circuit 8 transfers the cyclic data to the main memory 2 through the system bus 4 to write the cyclic data in the received data region 53 of the main memory 2, so that the first CPU 1-1 or the second CPU 1-2 can then make read access to the cyclic data stored in the main memory 2.

In the meantime, the first CPU 1-1 or the second CPU 1-2 makes, for example, write access to cyclic data stored in the rewritable data region 54 in the main memory 2 to rewrite the cyclic data. At this time, according to specified timing, for example, timing based on the cyclic data transmit/receive period, timing instructed from the first CPU 1-1 or the second CPU 1-2, etc., the cyclic data control circuit 6 instructs the bus access control circuit 8 to read out cyclic data from the rewritable data region 54 in the main memory 2. The bus access control circuit 8 instructed to read out the cyclic data from the cyclic data control circuit 6 first checks the contents of the rewrite table 58 in the main memory 2. More concretely, the bus access control circuit 8 selects cyclic data indicated by flag "ug1" in the rewrite table 58 in the main memory 2. The bus access control circuit 8 reads out the selected cyclic data from the rewritable data region 54 in the main memory 2, and the read-out cyclic data is transferred from the main memory 2 to the cyclic data control circuit 6 through the system bus 4. The cyclic data control circuit 6 stores the transferred cyclic data in the rewritable data region 57 in the cyclic data memory 7 and instructs the transmission channel access control circuit 9 to transmit the cyclic data onto the data transmission channel 5. The transmission channel access control circuit 9 instructed to transmit the cyclic data from the cyclic data control circuit 6 transforms the cyclic data into the format suitable to be transmitted by way of the data transmission channel 5 and then transmits the transformed cyclic data onto the data transmission channel 5.

Thus, according to the illustrated embodiment of the present invention, the cyclic data rewritten now only among all the cyclic data is transmitted to and received by each control computer. Therefore, both the quantity of the cyclic data transferred between the main memory 2 and the communication controller 3 through the system bus 4 in the control computer and the quantity of the cyclic data transmitted through the data transmission channel 5 become small. As a result, the rate of the cyclic data occupying the system bus 4 is reduced to minimize the load of the cyclic data imposed on the system bus 4, so that the first and second CPU's 1-1 and 1-2 can make high speed access to the cyclic data stored in the main memory 2. Also, because the rate of the cyclic data occupying the data transmission channel 5 is considerably reduced, the load of the cyclic data imposed on the data transmission channel 5 can be minimized, and the transmittable quantity of data other than the cyclic data can be increased.

Figure 3:
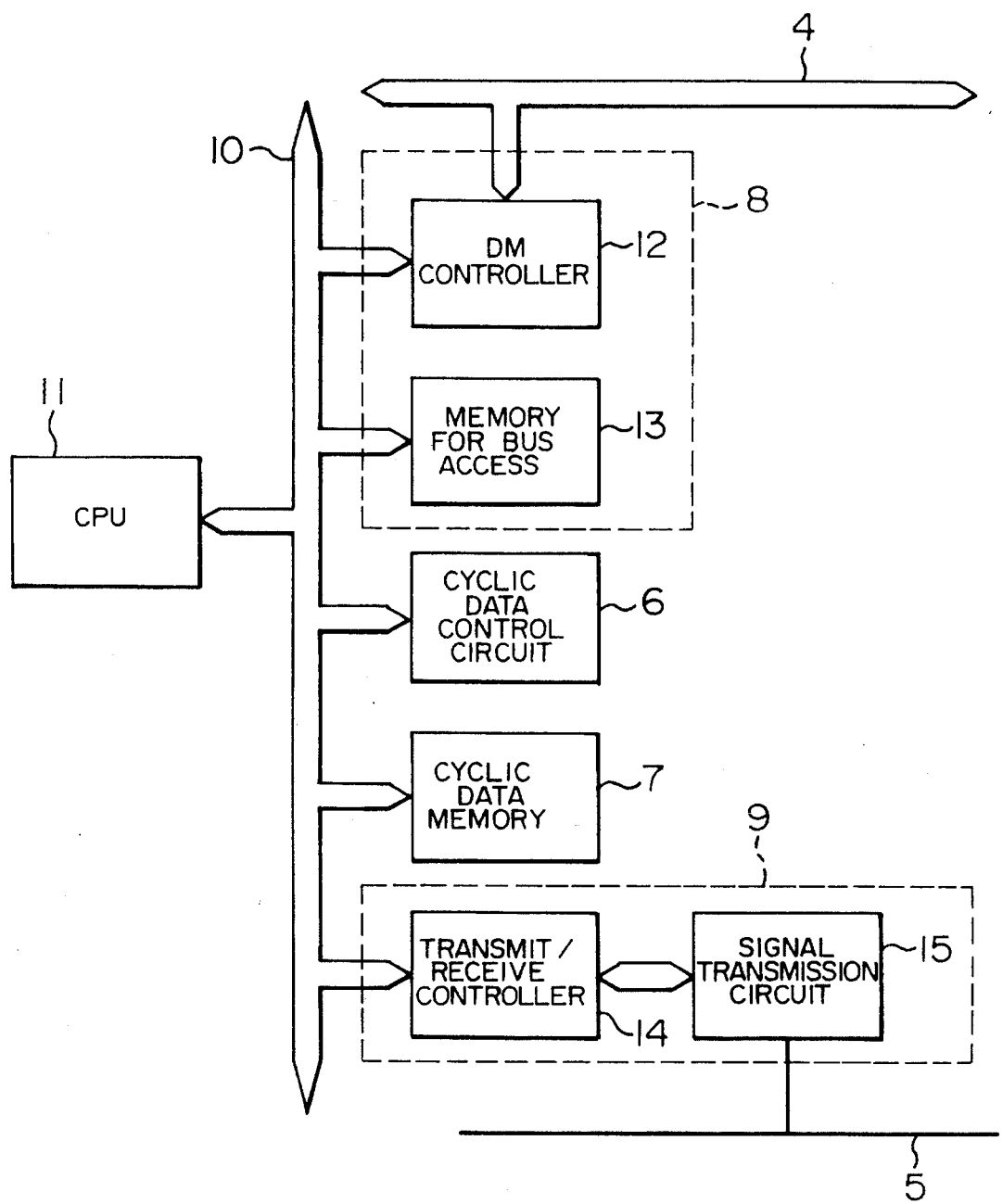
FIG. 3 is a block diagram showing the detailed internal structure of one form of the communication controller shown in FIG. 1.

FIG. 3 is a block diagram showing the detailed internal structure of the communication controller 3 in the aforementioned embodiment of the present invention.

Referring to FIG. 3, the reference numerals 10, 11, 12, 13, 14 and 15 designate a communication controller bus, a CPU for the communication controller 3, a DMA (direct memory access) controller, a memory for bus access, a data transmit/receive controller, and a signal transformation circuit, respectively. In FIG. 3, the same reference numerals are used to designate the same parts appearing in FIG. 1.

The bus access control circuit 8 is composed of the DMA controller 12 and the memory 13 for bus access, and the transmission channel access control circuit 9 is composed of the data transmit/receive controller 14 and the signal transformation circuit 15. The communication controller bus 10 is coupled to each of the DMA controller 12, the memory 13 for bus access, the cyclic data control circuit 6, the cyclic data memory 7, the data transmit/receive controller 14, the signal transformation circuit 15 and the CPU 11 for the communication controller 3. The DMA controller 12 and the signal transformation circuit 15 are connected to the system bus 4 and the data transmission channel 5 respectively.

Figure 4:
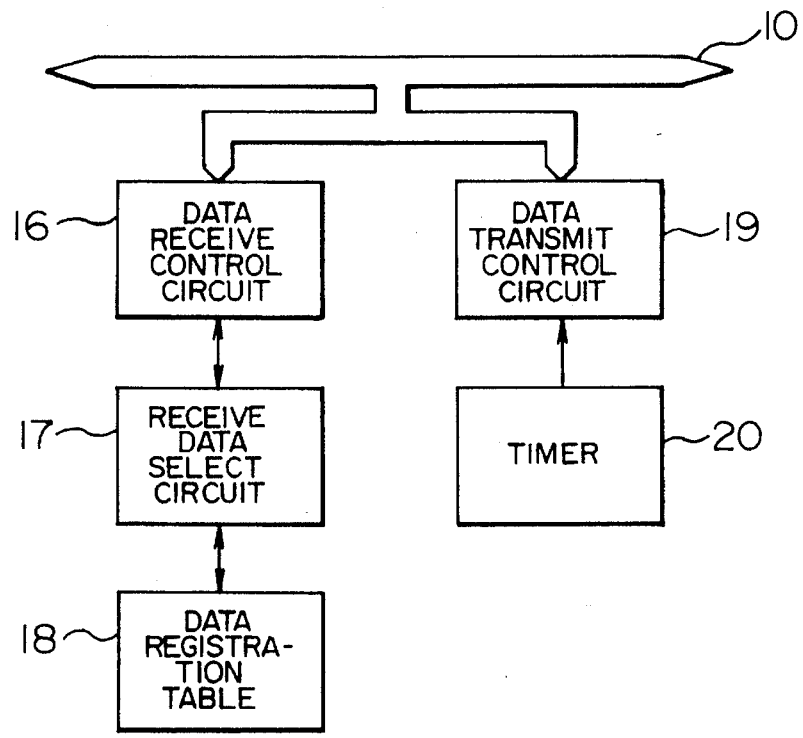
FIG. 4 is a block diagram showing the detailed internal structure of one form of the cyclic control circuit shown in FIG. 3.

FIG. 4 is a block diagram showing the detailed internal structure of one form of the cyclic data control circuit 6 in the communication controller 3.

Referring to FIG. 4, the reference numerals 16, 17, 18, 19 and 20 designate a data receive control circuit, a receive data select circuit, a data registration table, a data transmit control circuit and a timer, respectively. In FIG. 4, the same reference numerals are used to designate the same parts appearing in FIG. 3.

The data receive control circuit 16 and the receive data select circuit 17 are connected to the receive data control circuit 17 and the data registration table 18 respectively, and the data transmit control circuit 19 is connected to the timer 20. Each of the data receive control circuit 16 and the data transmit control circuit 19 is connected to the communication controller bus 10.

The operation of the communication controller 3 having the above structure will now be described by reference to FIGS. 1 and 4.

In the transmission channel access control circuit 9 connected to the data transmission channel 5, the signal transformation circuit 15 receives cyclic data transmitted by way of the data transmission channel 5, and, after transforming the received cyclic data into the format suitable for processing in the communication controller 3, supplies the transformed cyclic data to the transmit/receive controller 14. The transmit/receive controller 14 makes necessary error check, etc. for the received cyclic data and transfers the cyclic data to the cyclic data control circuit 6 through the communication controller bus 10. The data receive control circuit 16 in the cyclic data control circuit 6 receives the received cyclic data transferred from the transmit/receive controller 14 through the communication controller bus 10 and immediately supplies the received cyclic data to the receive data select circuit 17. The receive data select circuit 17 decides whether or not the received cyclic data is required for processing in the own control computer by reference to the data registration table 18. In the data registration table 18, cyclic data required for processing in the own control computer are registered. That is, cyclic data to be read and written in the own control computer are registered. When the receive data select circuit 17 decides that the received cyclic data is unnecessary for processing in the own control computer, the received cyclic data is discarded. On the other hand, when the receive data select circuit 17 decides that the received cyclic data is required for processing, the receive data select circuit 17 supplies the received cyclic data to the data receive control circuit 16 and instructs the data receive control circuit 16 to store the received cyclic data in both the cyclic data memory 7 and the main memory 2. In response to the above instruction, the data receive control circuit 16 transfers and stores the received cyclic data in the cyclic data memory 7 and also supplies the received cyclic data to the bus access control circuit 8 to instruct the bus access control circuit 8 to store the received cyclic data in the main memory 2.

The timing for transferring the received cyclic data may be such that the received cyclic data is transferred each time the data is received. However, when large overhead resulting from data transfer is inevitable as in the case of bus arbitration, the timing may be such that the data receive control circuit 16 measures the quantity of received cyclic data newly stored in the cyclic data memory 7 and transmits a certain predetermined quantity of cyclic data to the main memory 2 after those cyclic data are stored in the cyclic data memory 7, or may be such that all of received cyclic data stored in the cyclic data memory 7 are transferred to the main memory 2. The DMA controller 12 is instructed from the data receive control circuit 16 to transfer the received cyclic data. The DMA controller 12 acts to temporarily store the received cyclic data in the memory 13 for bus access until it acquires the right to occupy the system bus 4. After acquirement of the right to occupy the system bus 4, the DMA controller 12 acts to read out the received cyclic data from the memory 13 for bus access. The read-out received cyclic data are transferred to the main memory 2 through the system bus 4 to be stored in the main memory 2. The first CPU 1-1 or the second CPU 1-2 makes read access through the system bus 4 to the received cyclic data stored in the main memory 2.

In the meantime, the first CPU 1-1 or the second CPU 1-2 makes, for example, write access to the cyclic data stored in the main memory 2 to rewrite the cyclic data. The cyclic data having the possibility of rewrite are stored in the rewritable data region 54 (FIG. 2), and the rewrite table 58 corresponding to the rewritable data region 54 is provided in the main memory 2 so that whether or not the cyclic data have been already rewritten can be decided by reference to the rewrite table 58. In this case, according to specified timing, for example, timing determined on the basis of the cyclic data transmit/receive period, the timer 20 in the cyclic data control circuit 6 instructs the DMA controller 12 in the bus access control circuit 8 through the data transmit control circuit 19 to read out the cyclic data (transmit cyclic data) to be transmitted from the main memory 2. In response to this read instruction, the bus access control circuit 8 checks the contents of the rewrite table 58 in the main memory 2 to select the cyclic data now rewritten, that is, the cyclic data which is indicated by flag "üg1" in the rewrite table 58. Then, this selected cyclic data is read out from the rewritable data region 54 in the main memory 2, and the thus read-out cyclic data is transferred through the system bus 4 to the data transmit control circuit 19 in the cyclic data control circuit 6. The data transmit control circuit 19 stores the transmit cyclic data in the cyclic data memory 7 and instructs the transmit/receive controller 14 in the transmission channel access control circuit 9 to transmit the transmit cyclic data onto the data transmission channel 5. In response to this transmit instruction, the transmit/receive controller 14 transforms the transmit cyclic data into the format suitable for transmission over the data transmission channel 5. Then, after addition of, for example, flag for error checking purpose, the signal transformation circuit 15 transforms the cyclic data into the format suitable for transmission by way of the data transmission channel 5 and transmits the cyclic data onto the data transmission channel 5.

By the use of the communication controller 3 capable of operation in the manner described above, not only the load of the cyclic data imposed on the system bus 4 can be minimized, and the first and second CPU's 1-1 and 1-2 can make high speed access to the cyclic data stored in the main memory 2, but also the load of the cyclic data imposed on the data transmission channel 5 can be minimized, and the transmittable quantity of data other than the cyclic data can be increased.

In the aforementioned embodiment of the present invention, the cyclic data received from the data transmission channel 5 are those registered beforehand in the cyclic data memory 7 in the communication controller 3 and also in the main memory 2. However, when the cyclic data to which the first CPU 1-1 or the second CPU 1-2 makes access cannot be definitely specified, there may be the case where the main memory 2 does not store the desired cyclic data when the first CPU 1-1 or the second CPU 1-2 makes access to the cyclic data stored in the main memory 2. In such a case, an undesirable page fault occurs due to the impossibility of acquiring the desired cyclic data, and the first CPU 1-1 or the second CPU 1-2 must make access to the desired cyclic data stored in, for example, an external storage unit.

Figure 5:
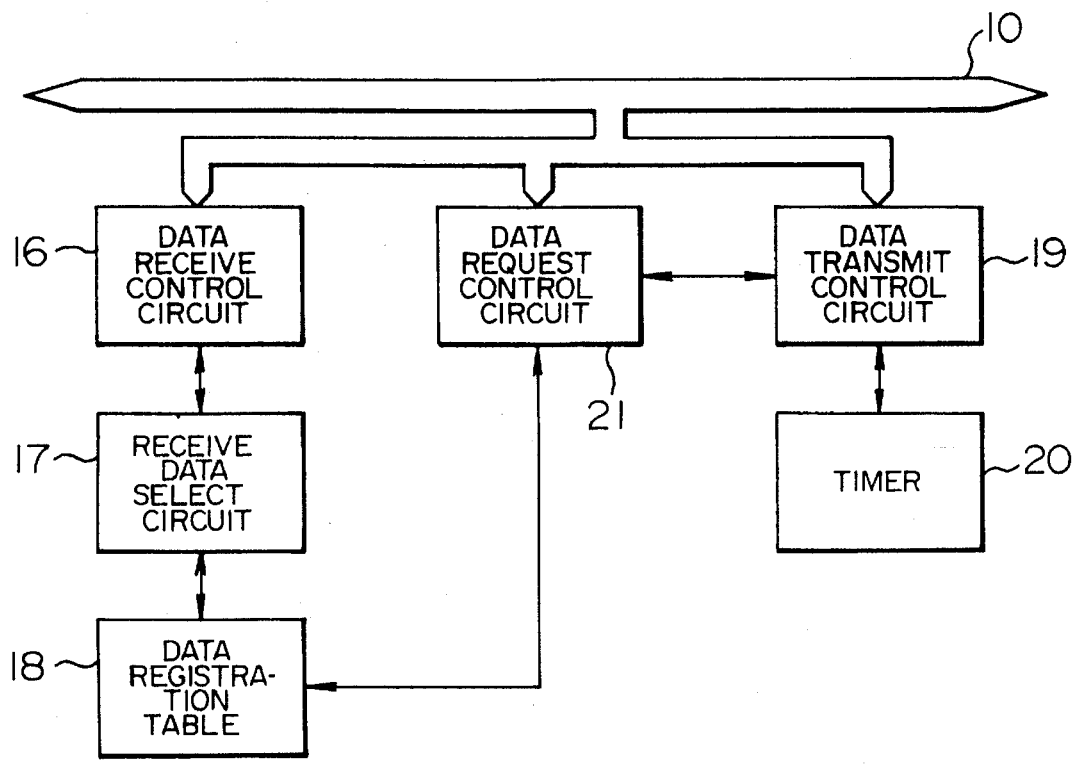
FIG. 5 is a block diagram showing the detailed internal structure of another form of the cyclic control circuit shown in FIG. 3.

FIG. 5 is a block diagram showing the detailed internal structure of another form of the cyclic data control circuit 6 in the communication controller 3. The cyclic data control circuit 6 shown in FIG. 5 is constructed so that, in the event of occurrence of an undesirable page fault regarding the cyclic data, the communication controller 3 requests another control computer to transfer the desired cyclic data.

In FIG. 5, the reference numeral 21 designates a data request control circuit, and the same reference numerals are used to designate the same parts appearing in FIG. 4.

The cyclic data control circuit 6 shown in FIG. 5 is not structurally different from that shown in FIG. 4 except that the latter does not include the data request control circuit 21 only, whereas the former includes the data request control circuit 21 connected to each of the communication controller bus 10, the data registration table 18 and the data transmit control circuit 19.

The operation of the cyclic data control circuit 6 shown in FIG. 5 does not essentially differ from that of the circuit 6 shown in FIG. 4. However, the mode of operation of the structure shown in FIG. 5 differs especially from that of the structure shown in FIG. 4, as will be described now. That is, when the first CPU 1-1 or the second CPU 1-2 requests access to the cyclic data, the cyclic data request information is supplied from the data request control circuit 21 to the data transmission channel 5 through the transmission channel access control circuit 9, and, at the same time, the cyclic data requested by the first CPU 1-1 or the second CPU 1-2 is registered on the data registration table 18. In this case, when another control computer transmits the desired cyclic data in response to the cyclic data request information, the cyclic data is written and stored in the main memory 2 according to the usual procedure for received cyclic data and then according to the usual procedure for writing and storing received cyclic data in the main memory 2. On the other hand, when the own control computer receives the cyclic data request information from another control computer, the data request control circuit 21 decides whether or not the own control computer can supply the cyclic data requested by the cyclic data request information by making reference to the data registration table 18. When the data request control circuit 21 decides that the requested cyclic data can be supplied, the requested cyclic data is read out from the cyclic data memory 7 to be transmitted through the data transmission channel 5 to the control computer from which the cyclic data request information has been transmitted.

Thus, according to the cyclic data control circuit 6 shown in FIG. 5, the cyclic data that cannot be acquired from the own control computer can be acquired from another control computer. Therefore, the required data processing can be executed in each of the control computers without giving rise to an undesirable page fault.

Figure 6:
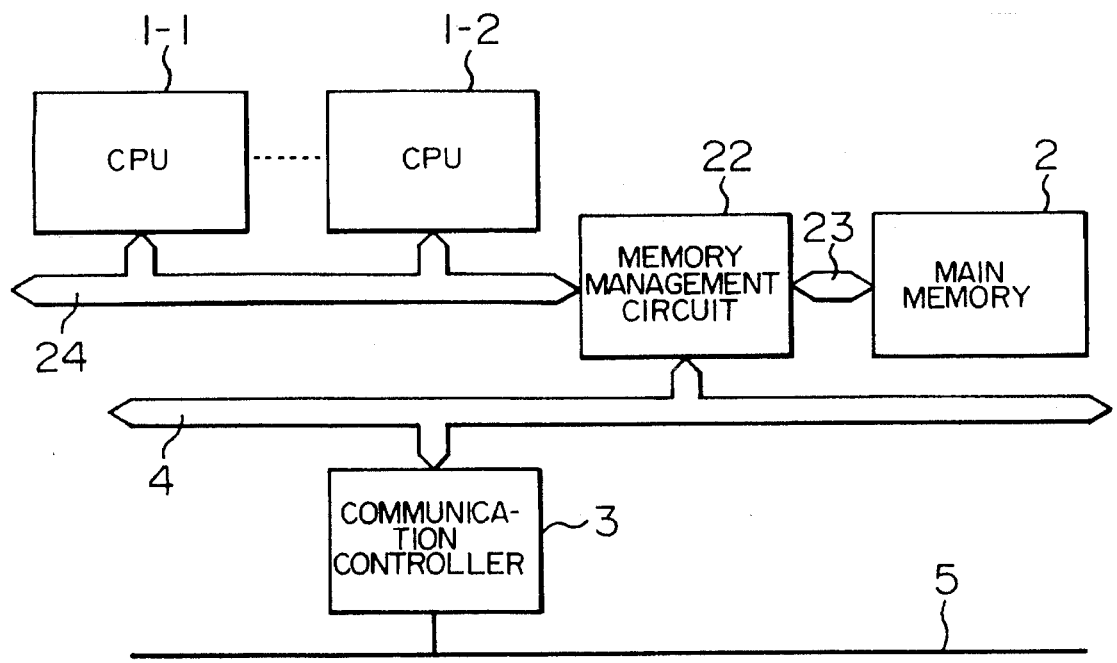
FIG. 6 is a block diagram showing the principal structure of a second embodiment of the data communication system according to the present invention.

FIG. 6 is a block diagram showing the principal structure of a second embodiment of the data communication system according to the present invention.

In FIG. 6, the reference numerals 22, 23 and 24 designate a memory management circuit, a bus exclusively for main memory, and a bus exclusively for CPU's, respectively, and the same reference numerals are used to designate the same parts appearing in FIG. 1.

Referring to FIG. 6, the first CPU 1-1 and the second CPU 1-2 are coupled by the bus 24 exclusively for CPU's, and the memory management circuit 22 is coupled to the main memory 2 by the bus 23 exclusively for main memory and also coupled to both the system bus 4 and the bus 24 exclusively for CPU's.

The second embodiment of the data communication system differs from the aforementioned first embodiment in the structure of the main control part of each of the control computers. However, because the operation is essentially the same as that of the first embodiment, any detailed description of the operation will be unnecessary.

Figure 7:
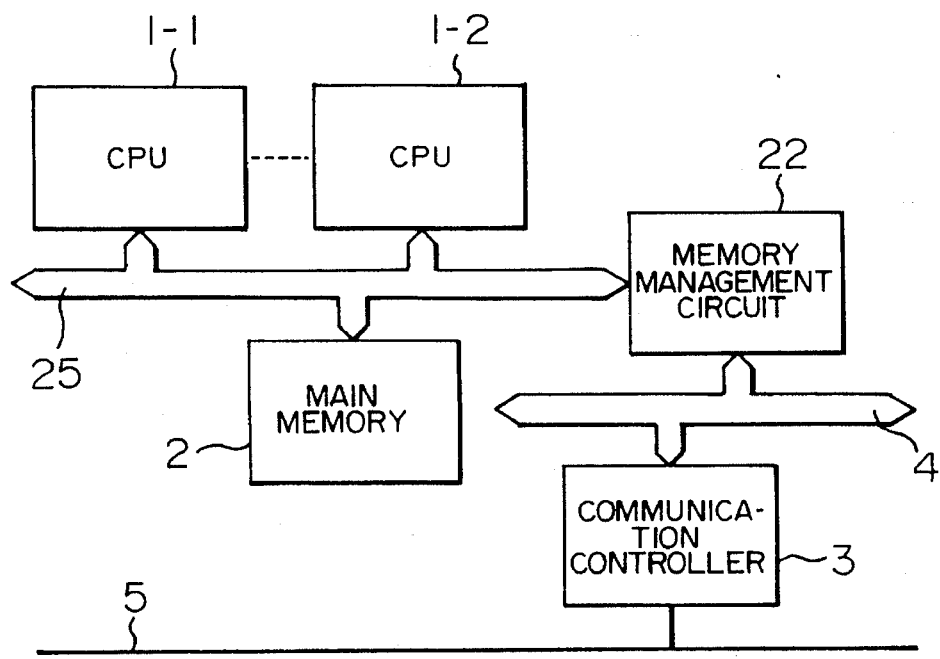
FIG. 7 is a block diagram showing the principal structure of a third embodiment of the data communication system according to the present invention.

FIG. 7 is a block diagram showing the principal structure of a third embodiment of the data communication system according to the present invention.

In FIG. 7, the reference numeral 25 designates a CPU/memory coupling bus, and the same reference numerals are used to designate the same parts appearing in FIG. 6.

Referring to FIG. 7, the first CPU 1-1, the second CPU 1-2 and the main memory 2 are coupled to the CPU/memory coupling bus 25, and the memory management circuit 22 is coupled to both the system bus 4 and the CPU/memory coupling bus 25.

The third embodiment of the data communication system differs also from the first and second embodiments in the structure of the main control part of each of the control computers. However, because the operation of the third embodiment is also essentially the same as that of the first and second embodiments, any detailed description of the operation will be unnecessary.

Figure 8:
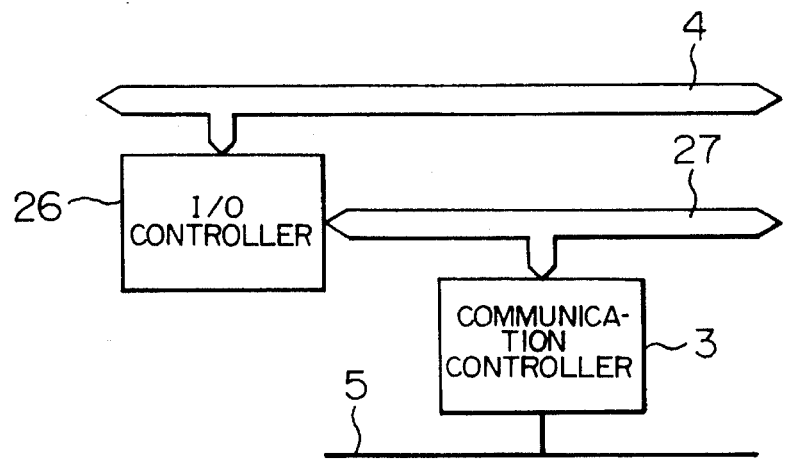
FIG. 8 is a block diagram showing the principal structure of a fourth embodiment of the data communication system according to the present invention.

FIG. 8 is a block diagram showing the principal structure of a fourth embodiment of the data communication system according to the present invention.

FIG. 8, the reference numerals 26 and 27 designate an I/O controller and an I/O bus respectively, and the same reference numerals are used to designate the same parts appearing in FIG. 6.

In the fourth embodiment of the data communication system too, the structure of the main control part of each of the control computers differs from that of the first, second and third embodiments. However, because the operation of the fourth embodiment is essentially the same as that of the first to third embodiments, any detailed description of the operation will be unnecessary.

The aforementioned embodiments of the present invention have referred to the case where the rewrite table 58 is accommodated in the main memory 2. However, this rewrite table 58 need not necessarily be accommodated in the main memory 2, and a memory exclusively acting as such a rewrite table may be coupled to the system bus 4. In this case, the memory exclusively acting as the rewrite table may be located at a position that can be easily accessed for the purpose of rewriting at the same time as that when the first CPU 1-1 or the second CPU 1-2 rewrites the cyclic data.

The procedure for reading out the cyclic data in the aforementioned embodiments of the present invention is such that the timer 20 in the cyclic data control circuit 6 in the communication controller 3 periodically instructs the data transmit control circuit 19 to read out cyclic data from the rewrite table 58, and, after the data transmit control circuit 19 responding to this instruction selects the cyclic data rewritten as a result of reading the rewrite table 58, the selected cyclic data only is read out from the main memory 2.

The aforementioned embodiments of the present invention have referred to the case where the rewrite table 58 is located at a selected position. However, the data communication system according to the present invention is not limited to the case where the rewrite table 58 is essentially provided, and the function and effect similar to those described above can also be achieved when, without the provision of the rewrite table 58, the rewritten cyclic data only is transferred to the communication controller 3 according to a pre-set program.

Figure 9:
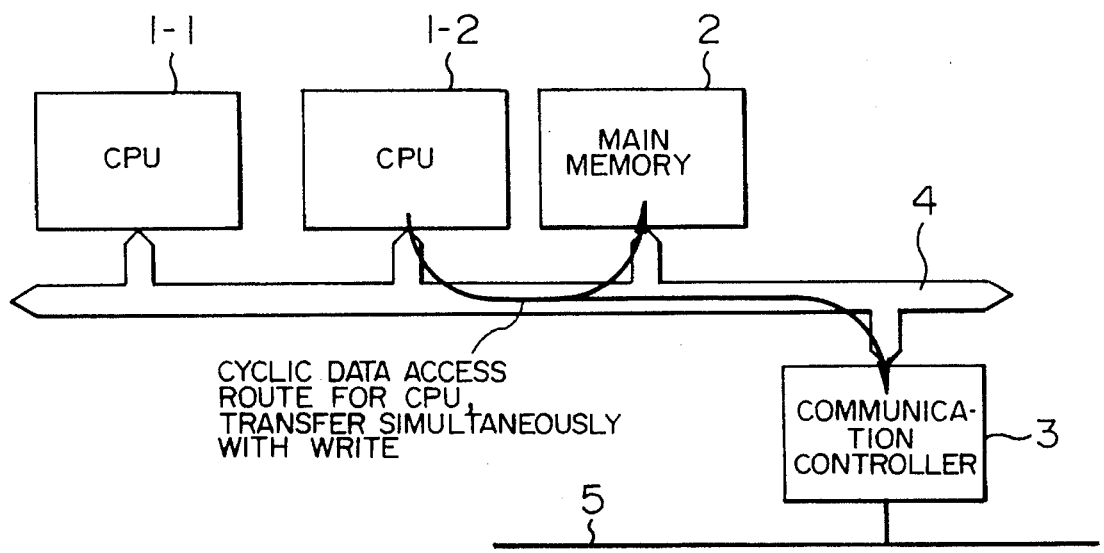
FIG. 9 is a block diagram of a modification of the present invention and illustrates how rewritten cyclic data is transferred to the communication controller according to a program.

FIG. 9 illustrates the operation mode when the data communication system is programmed so that such rewritten cyclic data is transferred to the communication controller 3. In this case, in order to transfer cyclic data to the communication controller 3 too each time the first CPU 1-1 or the second CPU 1-2 writes the cyclic data in the main memory 2, the program for operating the first CPU 1-1 or the second CPU 1-2 is suitably modified.

Further, in another embodiment of the present invention in which the rewrite table 58 is not provided, a method is used in which all of rewritable cyclic data having the possibility of rewrite in the own control computer are read out from the main memory 2, and rewritten cyclic data to be transmitted by way of the data transmission channel 5 is selected in the communication controller 3.

FIG. 10 is a block diagram showing the principal structure of the communication controller 3 adapted to execute the above manner of cyclic data transfer.

In FIG. 10, the reference numerals 28 and 29 designate a read-out cyclic data storage circuit and a rewrite cyclic data select circuit, and the same reference numerals are used to designate the same parts appearing in FIGS. 1, 3 and 4.

Referring to FIG. 10, the read-out cyclic data storage circuit 28 and the rewrite cyclic data select circuit 29 are connected to each other and are also connected to the communication controller bus 10, and the rewrite cyclic data select circuit 29 is also connected to the data transmit control circuit 19.

In the communication controller 3 having the above structure, cyclic data to be transferred and having the same content as that of rewritable cyclic data written in the main memory 2 is temporarily stored through the communication controller bus 10 in the read-out cyclic data storage circuit 28, and the read-out cyclic data storage circuit 28 informs the rewrite cyclic data select circuit 29 that the transferred cyclic data has arrived. In response to this information, the rewrite cyclic data select circuit 29 reads out the transferred cyclic data from the cyclic data storage circuit 28, and, at the same time, reads out from the cyclic data memory 7 the cyclic data stored at the same address where the transferred cyclic data is stored. Then, the rewrite cyclic data select circuit 29 compares these two read-out cyclic data, and, when they differ from each other, replaces the cyclic data stored at the corresponding address in the cyclic data memory 7 by the rewritten data, and supplies the rewritten transferred cyclic data only to the data transmit control circuit 19. Upon receiving the rewritten transferred cyclic data, the data transmit control circuit 19 transmits the transferred cyclic data onto the data transmission channel 5 according to the process described already. In the form shown in FIG. 10, the load imposed on the system bus 4 during reading cannot be reduced because all the rewritable cyclic data are read out from the main memory 2. However, the load imposed on the data transmission channel 5 and the load imposed on the system bus 4 during writing the received cyclic data in the main memory 2 can be alleviated because the rewritten cyclic data is selected in the communication controller 3 before being transmitted onto the data transmission channel 5.

FIGS. 11A and 11B illustrate two examples respectively of the data frame accommodating rewritten cyclic data transmitted onto the data transmission channel 5. FIG. 11A illustrates the data frame in which the rewritten cyclic data have respectively different data lengths, while FIG. 11B illustrates the data frame in which all of rewritten cyclic data have the same data length.

As will be seen in FIG. 11A showing the conventional data frame, the data information including the data address information and the data length information is added before each of rewritten cyclic data, and these rewritten cyclic data are allocated to be accommodated in order in the data frame. Then, the frame header is disposed at the head of the data frame, and the frame check sequence (FCS) is disposed at the end of the data frame.

On the other hand, as will be seen in FIG. 11B showing the data frame used in the present invention, rewritten cyclic data having the same data length are allocated to be accommodated in order in the data frame, and a copy of the rewrite table accommodated in the main memory 2 or a copy of the rewrite table accommodated in the rewrite cyclic data select circuit 29 is disposed before the rewritten cyclic data. Then, the frame header is disposed at the head of the data frame, and the frame check sequence (FCS) is disposed at the end of the data frame, as in the case of the conventional data frame.

The aforementioned embodiments of the present invention have referred to the use of cyclic data as periodic data. However, the periodic data used in the present invention is in no way limited to the cyclic data, and the present invention is similarly effectively applicable to the case where any other periodic data analogous to the cyclic data ia used.

Figure 12A:
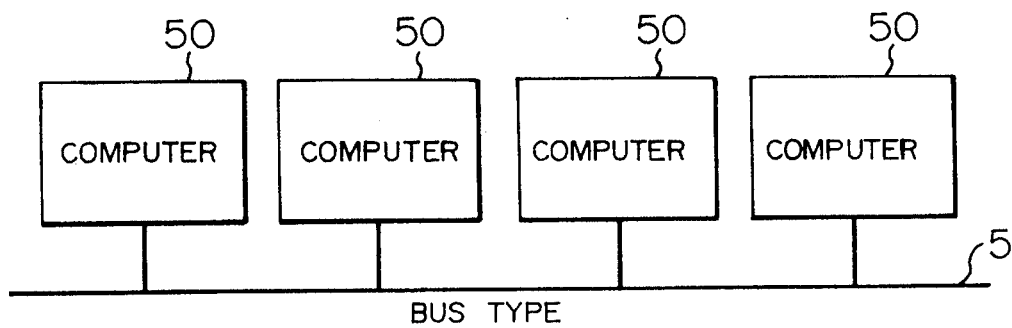
FIGS. 12A, 12B and 12C schematically show various forms respectively of the data transmission channel to which a plurality of control computers are coupled.
Figure 12B:
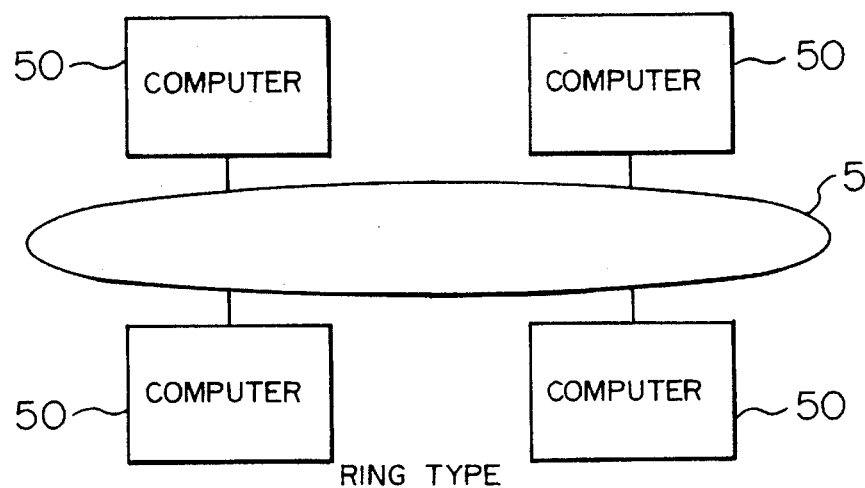
Figure 12C:
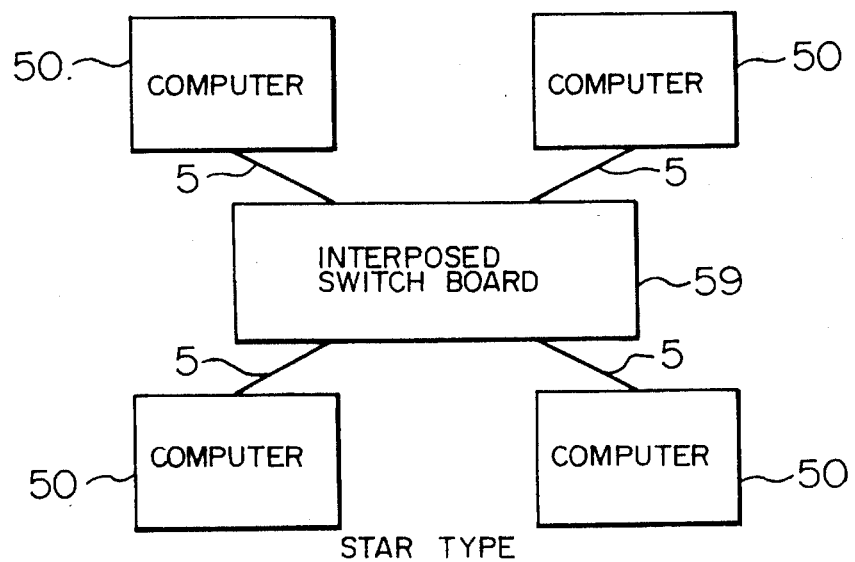

Further, irrespective of the mode of transmission of data, the data transmission channel 5 to which the plural control computers 50 are coupled in the data communication system according to the present invention may be of a bus type as shown in FIG. 12A, a ring type as shown in FIG. 12B, a star type including an interposed switchboard 59 as shown in FIG. 12C, etc.

It will be seen from the above description of the present invention that, at the time of receiving periodic data, the communication controller 3 in each of the control computers acquires from the data transmission channel 5 the periodic data required for processing in the own control computer and transfers and stores the acquired periodic data in the main memory 2 through the system bus 4. However, this received periodic data is the periodic data now rewritten among those stored in the main memory 2, and the periodic data not rewritten now is not included. Therefore, the quantity of the received periodic data is not so large. Thus, even when all the received periodic data are transferred to the main memory 2 through the system bus 4, the rate of occupation of the system bus 4 by the received periodic data is low, and the load of the periodic data imposed on the system bus 4 is minimized, so that the first and second CPU's 1-1 and 1-2 can make high speed access to the periodic data stored in the main memory 2.

Also, at the time of transmission of periodic data, the communication controller 3 acquires periodic data now rewritten and to be transmitted from among the periodic data stored already or to be stored now in the main memory 2, and the acquired periodic data to be transmitted only is transmitted onto the data transmission channel 5, while the periodic data to be transmitted but not to be rewritten now is not transmitted onto the data transmission channel 5. Therefore, the actually transmitted quantity of the periodic data to be transmitted is not so large. Thus, at the time of transferring to the communication controller 3 the periodic data to be transmitted, the load of the periodic data imposed on the system bus 4 is minimized, so that the first and second CPU's 1-1 and 1-2 can make high speed access to the periodic data stored in the main memory 2.

Further, when the periodic data to be transmitted are transmitted onto the data transmission channel 5, the actually transmitted quantity of the periodic data to be transmitted is not so large as described above. Therefore, the rate of occupation of the data transmission channel 5 by the periodic data to be transmitted is considerably low as compared to that in a known data communication system of this kind, and the load of the periodic data imposed on the data transmission channel 5 is minimized, so that the transmittable quantity of data other than the periodic data can be increased. Besides the above advantage, when the increase in the transmittable quantity of the other data is limited to a certain extent, the total quantity of the periodic data that can be transmitted and received by way of the data transmission channel 5 can be correspondingly increased, and the period of periodic data transmission allocation can be made higher.

The present invention relates to a data communication system designed for making transmission and reception of periodic data between a plurality of control computers and is especially effective to enhance the degree of utilization of a system bus extending into each of the control computers and also to enhance the degree of utilization of a data transmission channel transmitting the periodic data.

At the time of receiving periodic data in the data communication system, the periodic data required for the own control computer is acquired from the data transmission channel, and, after storing once this acquired periodic data in a memory provided for storing periodic data, the periodic data is transferred to and stored in a main memory through the system bus. In this case, the received periodic data is only the periodic data rewritten now among those stored already in the main memory, and the periodic data not rewritten now is not included. Therefore, the quantity of the received periodic data is not so large. Thus, even when the received periodic data may be transferred to the main memory through the system bus, the rate of occupation of the system bus by the received periodic data becomes low.

Further, at the time of transmitting periodic data, the communication controller selectively reads out the periodic data rewritten now and to be transmitted from among those stored in the main memory to be transmitted, and this periodic data read out now and to be transmitted only is transmitted to the data transmission channel, while the periodic data to be transmitted but not rewritten now is not transmitted onto the data transmission channel. Therefore, the actually transmitted quantity of the periodic data is not so large, and the rate of occupation of the system bus by the periodic data to be transmitted at the time of reading the periodic data to be transmitted becomes low. Also, the rate of occupation of the data transmission channel by the periodic data to be transmitted at the time of transmission of the periodic data to be transmitted onto the data transmission channel becomes considerably low as compared to that in a known data communication system of this kind, so that the total quantity of the periodic data that can be transmitted and received through the data transmission channel can be correspondingly increased, and the period of periodic data transmission allocation can be made higher together with the increase in the transmittable quantity of other data.

In the prior art cyclic data communication system cited already, the load imposed on the communication controller seems to be alleviated during access to cyclic data, so that high speed access can be possibly achieved. However, it is still required that the cyclic data having a high access frequency among those received in each control computer is to be transferred from the communication controller to the shared memory through the system bus and it is also required that the cyclic data to be transmitted is to be transferred from the shared memory to the communication controller through the system bus. Thus, because the system bus is occupied during the transfer of these cyclic data, the transferred cyclic data imposes the load on the system bus, resulting in hindrance to the capability of high speed access to the cyclic data in the shared memory in each CPU. The present invention can solve such a problem of the prior art cyclic data communication system.

Further, in the prior art cyclic communication system, the quantity of the cyclic data transmitted and received through the data transmission channel increases, and the frequency of cyclic data transmission and reception also increases when the scale of the cyclic communication system becomes large resulting in an increase in the quantity of the control information or when the high precision of control requires apparatuses and equipments (for example, an industrial plant) controlled by the individual control computers. Accordingly, the rate of occupation of each of the system buses during the transfer of the cyclic data becomes correspondingly higher and, at the same time, the rate of occupation of the data transmission channel during the transmission and reception of the cyclic data becomes also correspondingly higher resulting in an undesirable reduction of data processing performance of the whole cyclic communication system. The present invention can also solve such another problem of the prior art cyclic communication system.

We claim:

1. A data communication system comprising:

A) a data transmission channel; and

B) a plurality of control computers coupled to said data transmission channel in common and each of said control computers including:
   1) at least one CPU,
   2) a main memory,
   3) a communication controller having:
      a) a built-in control portion for controlling data transmission and reception of cyclic data to and from said data transmission channel, and
      b) a built-in memory for storing cyclic data, and
   4) a system bus used for data transfer among said CPU, said main memory, and said communication controller, wherein:

C) each communication controller:
1) receives cyclic data, accessible at least within its own control computer from said data transmission channel,
2) stores all cyclic data received in the main memory of said control computer;
3) selects, out of the cyclic data stored in the main memory associated with its own control computer which can possibly be rewritten by data processing executed in said own control computer, that cyclic data actually rewritten by said own control computer, and
4) reads and transmits said selected cyclic data to other control computers through said data transmission channel; and D) the CPU of each control computer accesses the cyclic data from its own main memory only.

2. A data communication system according to claim 1, wherein said at least one CPU and said main memory are connected to said system bus and said communication controller is connected to both said system bus and said data transmission channel.

3. A data communication system according to claim 1, wherein said control computer further includes a CPU/memory coupling bus to which said main memory and said at least one CPU are connected and a memory management circuit connected to both said CPU/memory coupling bus and said system bus, and wherein said communication controller is connected to both said system bus and said data transmission channel.

4. A data communication system according to claim 1, wherein said main memory includes a rewrite table with entries corresponding to the respective cyclic data which can possibly be rewritten, said entries indicating whether or not said cyclic data are to be rewritten, and, wherein, on the basis of the content of said rewrite table, said communication controller selects said cyclic data to be read out from said main memory.

5. A data communication system according to claim 4, wherein said communication controller includes a timer and reads out said cyclic data from main memory in response to an output of said timer.

6. A data communication system according to claim 4, wherein said communication controller includes a timer and the cyclic data received from said data transmission channel is stored once in said cyclic data memory in said communication controller, and all received cyclic data so stored in said cyclic data memory are subsequently collectively transferred to said main memory in response to an output of said timer.

7. A data communication system according to claim 4, wherein said cyclic data received from said data transmission channel is stored once in said cyclic data memory in said communication controller, and all of said received data so stored in said cyclic data memory are subsequently collectively transferred to said main memory at predetermined intervals based on the period of reception of each cyclic data from said data transmission channel.

8. A data communication system comprising:
A) data transmission channel; and
B) a plurality of control computers coupled to said data transmission channel in common and each of said control computers including:
1) at least one CPU,
2) a main memory,
3) a communication controller having:
a) a built-in control portion for controlling data transmission and reception to and from said data transmission channel, and
b) a built-in memory for storing cyclic data, and
4) a system bus used for data transfer among said CPU, said main memory, and said communication controller, wherein:

C) each communication controller:
1) receives cyclic data, accessible at least within said control computer of which it is part from said data transmission channel,
2) stores all cyclic data received in the main memory of said control computer;
3) reads all cyclic data which can be possibly rewritten within its own control computer when reading the cyclic data stored in the main memory from its own control computer to transmit to other control computers,
4) compares all of said cyclic data with previously read cyclic data stored in its own built-in memory for storing cyclic data, and
5) transmits to other control computers through said data transmission channel only that cyclic data, the value of which has changed; and D) the CPU of each control computer accesses the cyclic data from its own main memory only.

9. A data communication system according to claim 8, wherein said at least one CPU and said main memory are connected to said system bus and said communication controller is connected to both said system bus and said data transmission channel.

10. A data communication system according to claim 8, wherein said control computer further includes a CPU/memory coupling bus to which said main memory and said at least one CPU are connected and a memory management circuit connected to both said CPU/memory coupling bus and said system bus, and wherein said communication controller is connected to both said system bus and said data transmission channel.

11. A data communication system comprising:
A) data transmission channel; and
B) a plurality of control computers coupled to said data transmission channel in common and each of said control computers including:
1) at least one CPU,
2) a main memory,
3) a communication controller having:
a) a built-in control portion for controlling data transmission and reception to and from said data transmission channel, and
b) a built-in memory for storing cyclic data, and
4) a system bus used for data transfer among said CPU, said main memory, and said communication controller, wherein:

C) each communication controller:
1) receives cyclic data, accessible at least within its own control computer from said data transmission channel, and
2) stores all cyclic data received in the main memory of its own control computer; and
3) transmits the cyclic data transferred from its own CPU to other control computers through said data transmission channel; and D) each CPU:
1) accesses the cyclic data from its own main memory only, and
2) in the case where a rewrite request generates for the cyclic data stored in its own main memory, transfers rewritten data to said main memory and to said communication controller.

12. A data communication system according to claim 11, wherein said at least one CPU and said main memory are connected to said system bus and said communication controller is connected to both said system bus and said data transmission channel.

13. A data communication system according to claim 4, wherein, at the time of transmission of rewritten cyclic data onto said data transmission channel, said rewrite table indicating whether or not each said periodic data has been rewritten is transmitted together with said cyclic data.

14. A data communication system according to claim 13, wherein said control computer further includes a CPU/memory coupling bus to which said main memory and said at least one CPU are connected and a memory management circuit connected to both said CPU/memory coupling bus and said system bus, and wherein said communication controller is connected to both said system bus and said data transmission channel.

15. A data communication system according to claim 11, wherein said control computer further includes a CPU/memory coupling bus to which said main memory and said at least one CPU are connected and a memory management circuit connected to both said CPU/memory coupling bus and said system bus, and wherein said communication controller is connected to both said system bus and said data transmission channel.

16. A data communication system according to claim 4, wherein said communication controller reads out said periodic data stored in said main memory according to timing based on the period of transmission of each said periodic data onto said data transmission channel.

17. A data communication system according to claim 13, wherein said control computer comprises, as part of its components, at least one CPU and a main memory connected to a system bus, and said communication controller connected to both of said system bus and said data transmission channel.

18. A data communication system according to claim 14, wherein, said control computer comprises, in lieu of said communication controller directly connected to said system bus, an I/O bus for connecting an I/O unit to said system bus, and said communication controller connected to both of said I/O bus and said data transmission channel, as part of its components.

19. A data communication system according to claim 18, wherein, when each said control computer requires periodic data not stored in said main memory of the own computer, said communication controller receives said periodic data from another control computer by way of said data transmission channel, and this received periodic data is transferred and stored in said main memory, thereafter said received periodic data being transferred and stored in said main memory each time it is received.

* * * * *